(12) United States Patent
Fukasawa

(10) Patent No.: US 7,778,669 B2
(45) Date of Patent: Aug. 17, 2010

(54) ELECTRONIC DEVICE, DATA PROCESSING SYSTEM, DATA PROCESSING METHOD AND RECORDING MEDIUM

(75) Inventor: Kazunori Fukasawa, Tachikawa-shi (JP)

(73) Assignee: Casio Hitachi Mobile Commications Co., Ltd., Tokyo (JP)

( * ) Notice: Subject to any disclaimer, the term of this patent is extended or adjusted under 35 U.S.C. 154(b) by 981 days.

(21) Appl. No.: 11/513,671

(22) Filed: Aug. 30, 2006

(65) Prior Publication Data

US 2007/0049343 A1  Mar. 1, 2007

(30) Foreign Application Priority Data

Sep. 1, 2005  (JP) .............................. 2005-253410

(51) Int. Cl.
*H04M 1/00* (2006.01)
(52) U.S. Cl. .................... 455/558; 455/550.1; 455/551; 455/557
(58) Field of Classification Search ................. 455/557, 455/558, 551, 550.1
See application file for complete search history.

(56) References Cited

U.S. PATENT DOCUMENTS

2003/0135748 A1* 7/2003 Yamada et al. ............... 713/193

FOREIGN PATENT DOCUMENTS

| EP | 0 915 410 | 5/1999 |
|---|---|---|
| JP | 2003-198718 | 7/2003 |
| JP | 2004-23182 | 1/2004 |
| JP | 2004-336719 | 11/2004 |
| JP | 2005-165666 | 6/2005 |

* cited by examiner

*Primary Examiner*—Raymond S Dean
(74) *Attorney, Agent, or Firm*—Cohen Pontani Lieberman & Pavane LLP

(57) ABSTRACT

A nonvolatile memory stores the contents ID of a downloaded content in association with the identification information of a removable UIM card. When downloading of contents data is requested, the CPU determines whether or not contents data which is identical to the requested contents data is already stored in a cellular phone. If the contents data which is identical to the requested contents data is not stored in the cellular phone, the CPU downloads the contents data. If stored, the CPU does not download the contents data, but determines whether or not identification information associated with the contents data matches with the identification information of the currently loaded UIM card. If the identification information does not match, the CPU updates the association of the contents ID and the identification information.

11 Claims, 15 Drawing Sheets

| CONTENTS ID | TELEPHONE NUMBER |
|---|---|
| 1 | 090×××○○○○ |
|  | 090×××△△△△ |
| 2 | 090×××○○○○ |
| 3 | 090×××△△△△ |
| 4 | 090×××○○○○ |
|  | 090×××▽▽▽▽ |
|  | 090×××△△△△ |
| ... | ... |

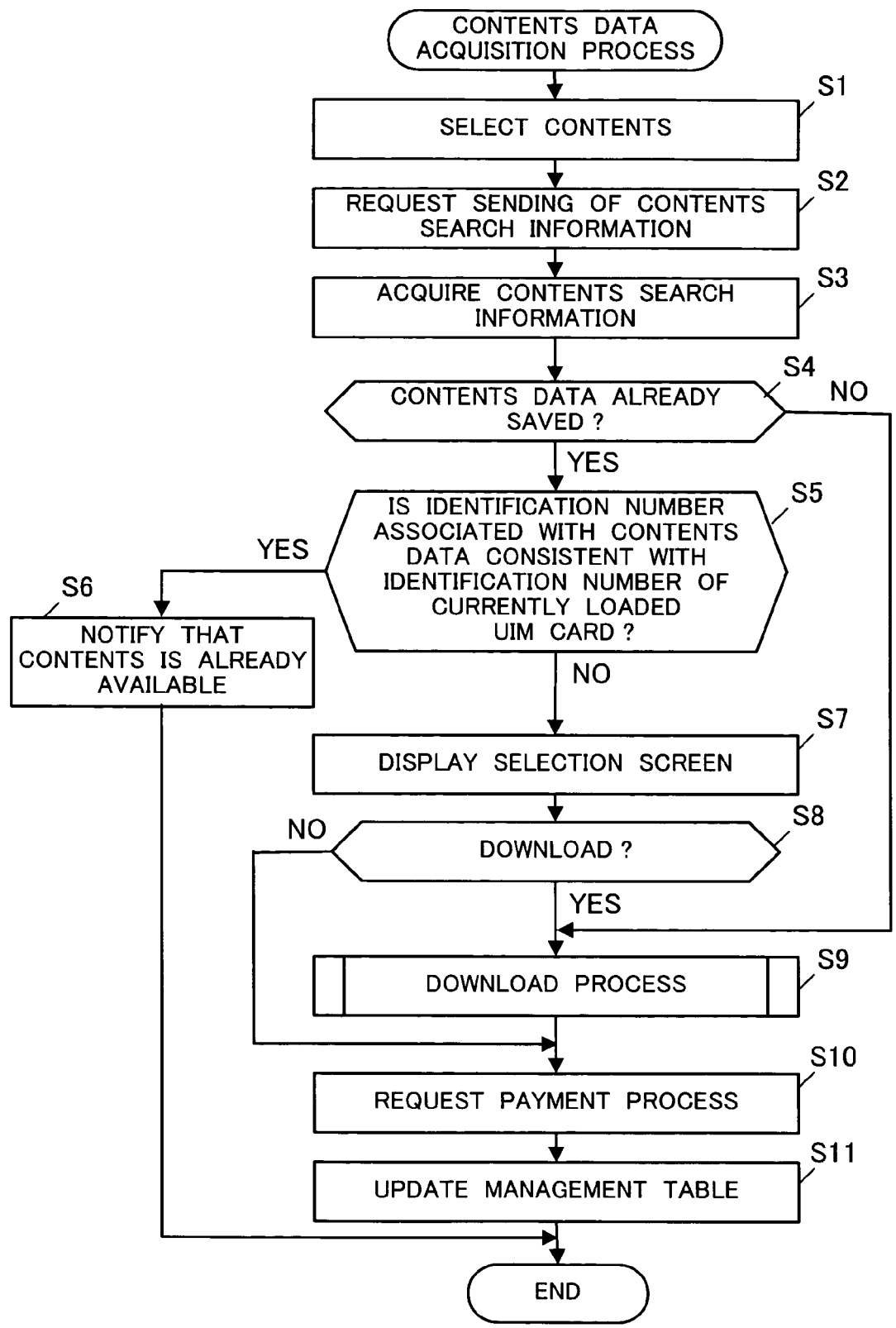

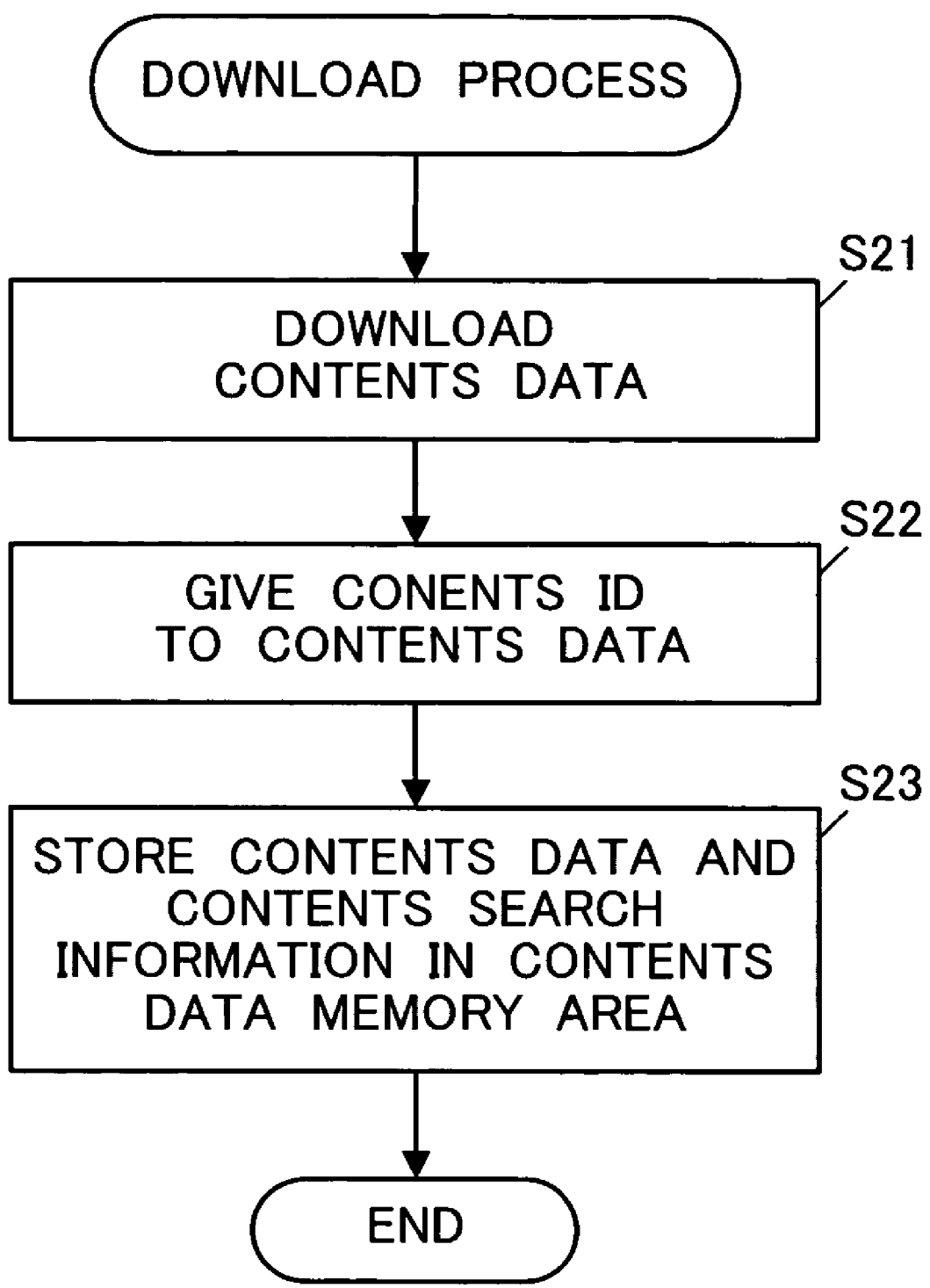

FIG.13A

| MANAGEMENT CODE | FEE SCHEDULE |
|---|---|
| 012345 | 100 YEN PER MONTH |
| 234567 | 10 YEN PER EACH USAGE |
| ... | ... |

FIG.13B

| TELEPHONE NUMBER | MANAGEMENT CODE | USE DATE AND TIME |
|---|---|---|
| 090×××free×OOOO | 234567 | SEPTEMBER 1, 2006 15:30 AND 45 SEC. |
| 090×××OOOO | 012345 | SEPTEMBER 2, 2006 11:25 AND 30 SEC |
| ... | ... | ... |

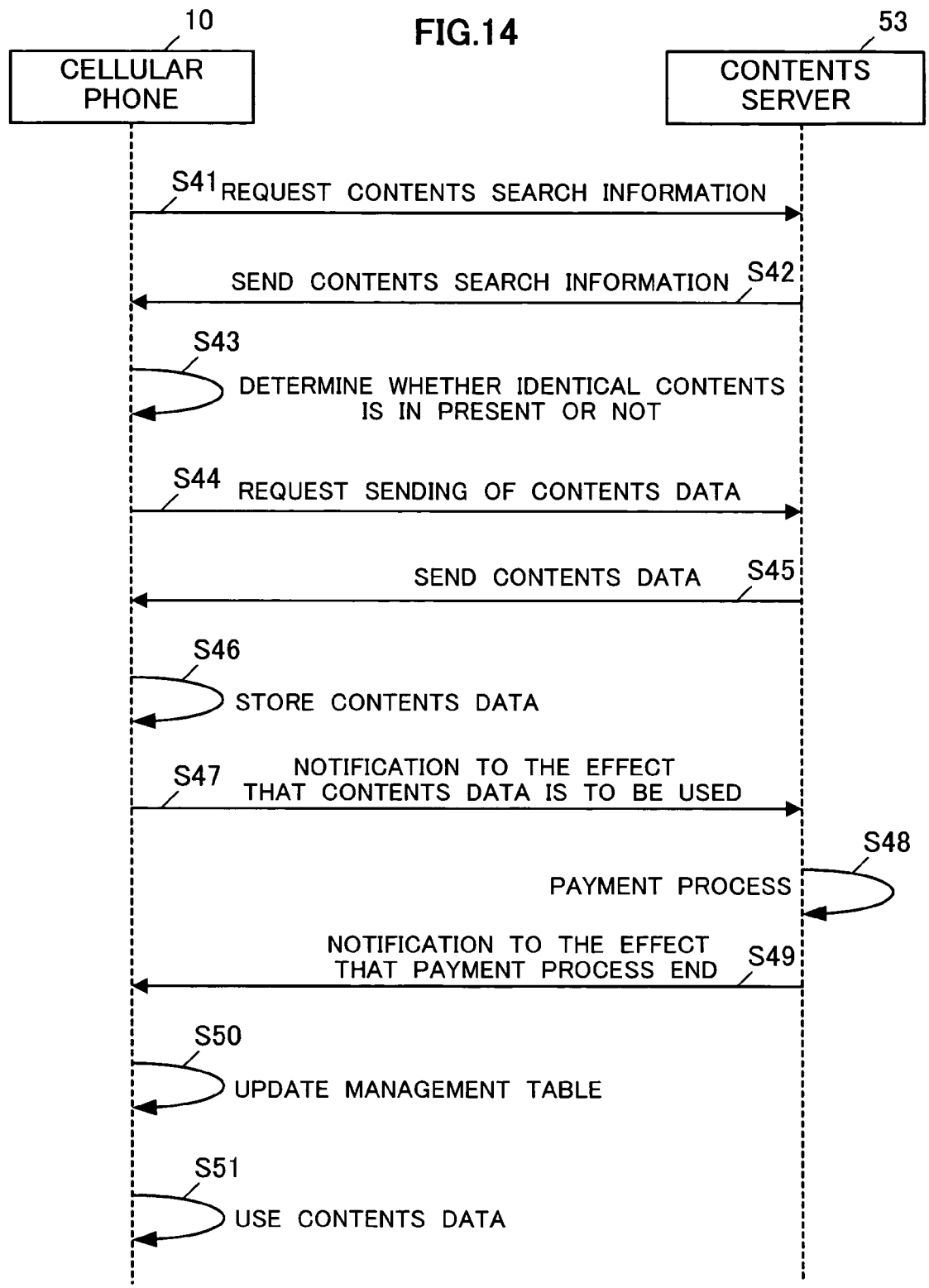

| ITEM NAME | CONDITION |
|---|---|
| MANAGEMENT CODE | MANAGEMENT CODE START NUMBER "9" |
| TITLE | INCLUDE KEYWORD "TRAFFIC INFORMATION" |
| CREATION DATE AND TIME | ONE MONTH BEFORE CURRENT DATE AND TIME |
| ... | ... |
| URL | START "https://" |
| ... | ... |

ELECTRONIC DEVICE, DATA PROCESSING SYSTEM, DATA PROCESSING METHOD AND RECORDING MEDIUM

BACKGROUND OF THE INVENTION

1. Field of the Invention

The present invention relates to an electronic device, a data processing system, a data processing method and a recording medium.

2. Description of the Related Art

Recently, cellular phones based on the IMT (International Mobile Telecommunication)-2000 standard for communication standardization are developed. This standard enables cellular phones to employ a structure that an UIM (User Identity Module) card which has subscriber information (IMSI: International Mobile Subscriber Identity) or the like stored therein is separable from a cellular phone main body. Each user can use the cellular phone by loading the UIM card into the cellular phone main body.

Such a cellular phone may be used by a plurality of users. For example, proposed in Unexamined Japanese Patent Application KOKAI Publication No. 2004-336719 is a mobile terminal which stores data in the cellular phone encrypted in a unique folder associated with the IMSI of the UIM card to protect the privacy of each user.

In the cellular phone using the foregoing UIM card, however, because each piece of data is stored in association with the UIM card, the data cannot be used if the UIM card corresponding to the data is not loaded. Therefore, even with the identical contents data already stored in the memory of the cellular phone in downloading contents data, in a case where the contents data is downloaded when the cellular phone is loaded with another UIM card, it is necessary to download the contents data again. As a result, the identical contents data may be redundantly saved in the memory, so that the space efficiency of the memory is poor.

SUMMARY OF THE INVENTION

The present invention has been made in view of the problem of the conventional technology, and it is an object of the invention to provide an electronic device, a data processing system, a data processing method, and a recording medium that can efficiently use a memory area which stores data.

To achieve the object, an electronic device according to the invention that receives data from an external device over a communication network, comprises:

a memory unit which stores the data received from the external device, and stores a data number of the data in association with unique information stored in an external memory medium removable from the electronic device;

a read-out unit which reads out the unique information from the removable external memory medium with the external memory medium loaded;

a receiving unit which receives an instruction of selecting data to be acquired form the eternal device;

a data presence/absence determination unit which determines whether or not data identical to the data indicated by the selection instruction is already stored in the memory unit; and an operation control unit which performs a control in such a manner as to change an association of the data number of the data and the unique information stored in the memory unit when the data presence/absence determination unit determines that the data identical to the data indicated by the selection instruction is already stored in the memory unit, and requests the external device to send the data indicated by the selection instruction when the data presence/absence determination unit determines that the data identical to the data indicated by the selection instruction is not stored in the memory unit.

Because the invention makes it possible to perform a control in such a manner as not to acquire data again if the data which is identical to selected data is already acquired, saving the data redundantly is prevented, so that it is possible to use a memory area efficiently.

BRIEF DESCRIPTION OF THE DRAWINGS

These objects and other objects and advantages of the present invention will become more apparent upon reading of the following detailed description and the accompanying drawings in which:

FIG. 8 is a diagram illustrating an example of the structure of data stored in a management table;

FIG. 9 is a flowchart illustrating a contents data acquisition process executed by the cellular phone;

FIG. 11 is a flowchart illustrating a download process of contents data;

FIG. 13A is a diagram illustrating an example of the structure of data stored in a fee table database, and FIG. 13B is a diagram illustrating an example of the structure of data stored in a user-use-history database;

FIG. 14 is a diagram illustrating the flow of the processes of an entire wireless communication system of the embodiment; and FIG. 15 is a diagram illustrating an example of the structure of data stored in a condition table.

DETAILED DESCRIPTION OF THE PREFERRED EMBODIMENTS

Preferred embodiments of the invention will be explained in detail with reference to the accompanying drawings.

Figure 1:
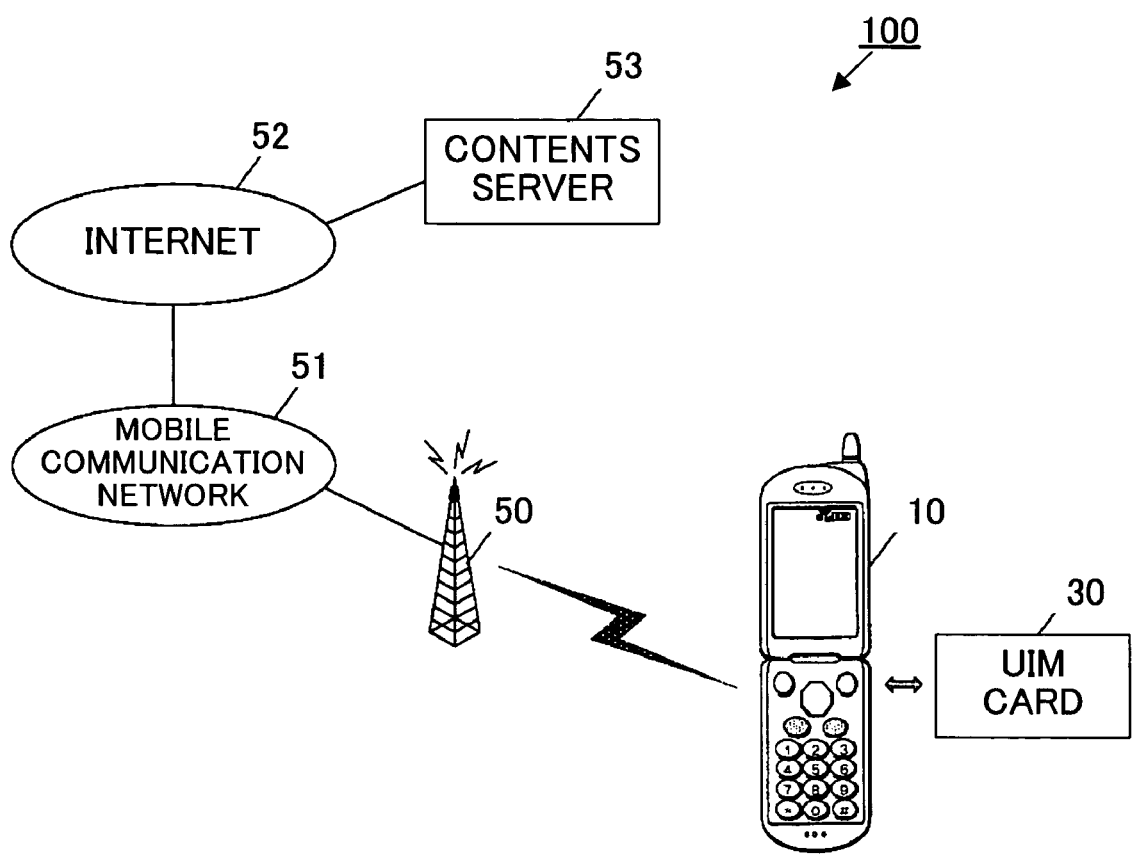
FIG. 1 is a system structural diagram of a cellular phone system according to an embodiment of the invention.

FIG. 1 illustrates the system structure of a cellular phone system 100 according to an embodiment. As illustrated in the figure, the cellular phone system 100 has a cellular phone 10, a base station 50 which relays a communication of the cellular phone 10, and a contents server 53. The base station 50 and the contents server 53 are connected together over a mobile communication network 51 and the Internet 52. A user can freely remove an UIM card 30 from the cellular phone 10, and attach this card to the cellular phone 10. Typically, the UIM card 30 is removed or attached with the power of the cellular phone 10 being OFF. When loaded with the UIM card 30, the cellular phone 10 can make a call with another cellular phone, and download contents data from the contents server 53.

Figure 2:
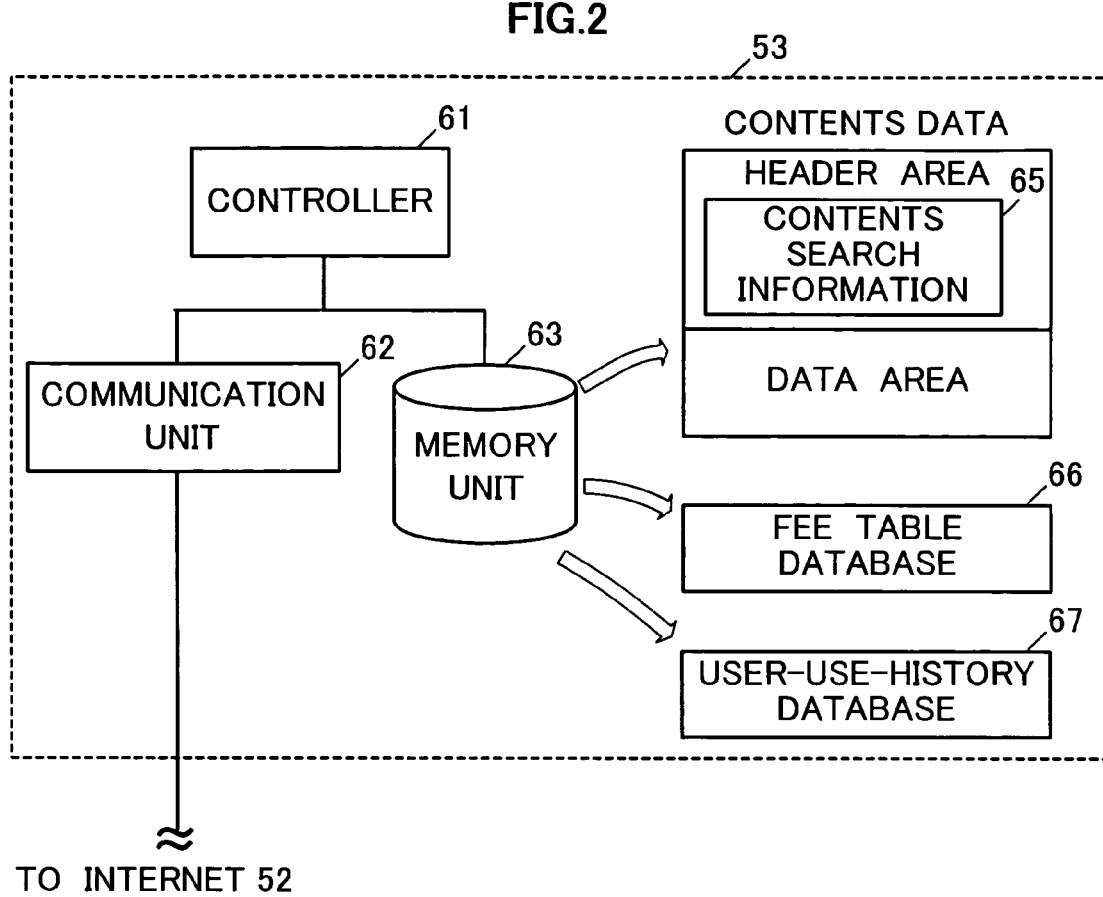
FIG. 2 is a block diagram illustrating the structure of a contents server.

Next, the structure of the contents server 53 will be explained with reference to FIG. 2. The contents server 53 has a controller 61, a communication unit 62, and a memory unit 63.

The controller 61 comprises a CPU, and controls each unit of the contents server 53 in accordance with an operating system (OS), a control program, and the like stored in the memory unit 63. For example, the controller 61 controls the communication unit 62 to send contents data or the like stored in the memory unit 63 to the cellular phone 10.

The communication unit 62 comprises a predetermined communication device, such as an NIC (Network Interface Card), a router, or a modem. The communication unit 62 communicates with the cellular phone 10 under a control of the controller 61.

The memory unit 63 comprises a memory device, such as a RAM, a ROM, or a hard disk device. For example, the memory unit 63 stores the OS and the program for controlling the contents server 53 entirely.

The memory unit 63 stores contents data to be distributed to the cellular phone 10. The memory unit 63 stores contents search information 65 for each contents data. The contents search information 65 is used by the cellular phone 10 to determine whether or not the contents data is already stored in the cellular phone 10. For example, the contents search information 65 includes a management code, a title, a creation date and time, a data capacity, a version, and the like, of the contents data. In the embodiment, the memory unit 63 stores the contents data in a database, and the contents search information 65 is stored in the header area of each contents data. Putting an index on data stored in each header area facilitates the controller 61 to obtain contents search information 65 corresponding to an arbitral contents data. This structure is, however, just an example, and other embodiments can be employed.

Further, the memory unit 63 stores a fee table database 66, and a user-use-history database 67. Those will be explained in detail later.

As the cellular phone 10 requests sending of contents search information 65 on the contents data, the contents server 53 structured in such a manner sends the requested contents search information 65 to the cellular phone 10. As the cellular phone 10 requests the contents server 53 to send contents data, the contents server 53 sends the requested contents data to the cellular phone 10. Detail of the process executed by the contents server 53 will be explained in detail later.

Figure 3:
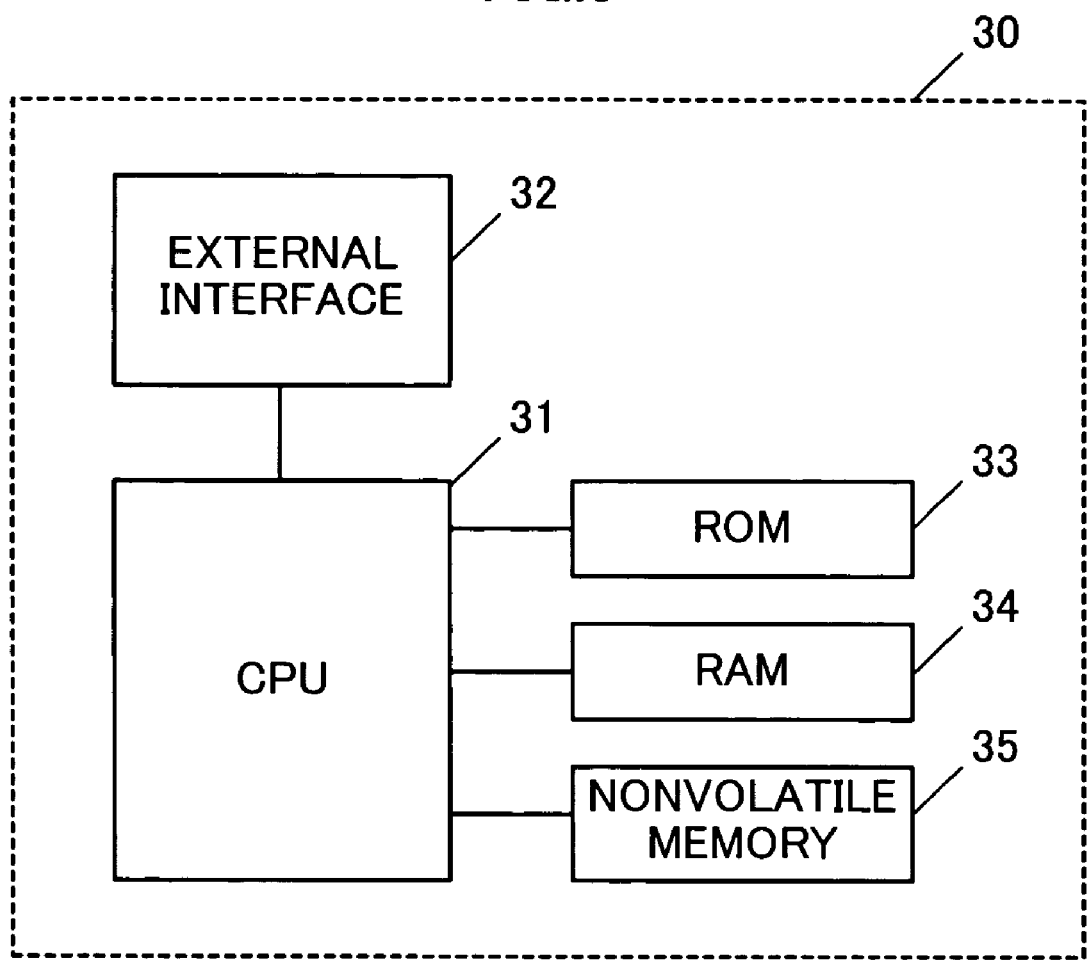
FIG. 3 is a block diagram illustrating the structure of a UIM card.

Next, the structure of the UIM card 30 will be explained. FIG. 3 illustrates the internal structure of the UIM card 30. As illustrated in the figure, the UIM card 30 has a CPU (Central Processing Unit) 31, an external interface 32, a ROM (Read Only Memory) 33, a RAM (Random Access Memory) 34 and a nonvolatile memory 35.

The CPU 31 reads out various programs stored in the ROM 33 into a work area in the RAM 34, and executes various processes in accordance with those programs.

The external interface 32 is for connecting the UIM card 30 and the cellular phone 10 to input/output data.

The ROM 33 comprises a nonvolatile semiconductor memory, and stores various programs and data to be run by the CPU 31.

The RAM 34 temporarily stores various programs to be run by the CPU 31 and data relating to those programs.

Figure 4:
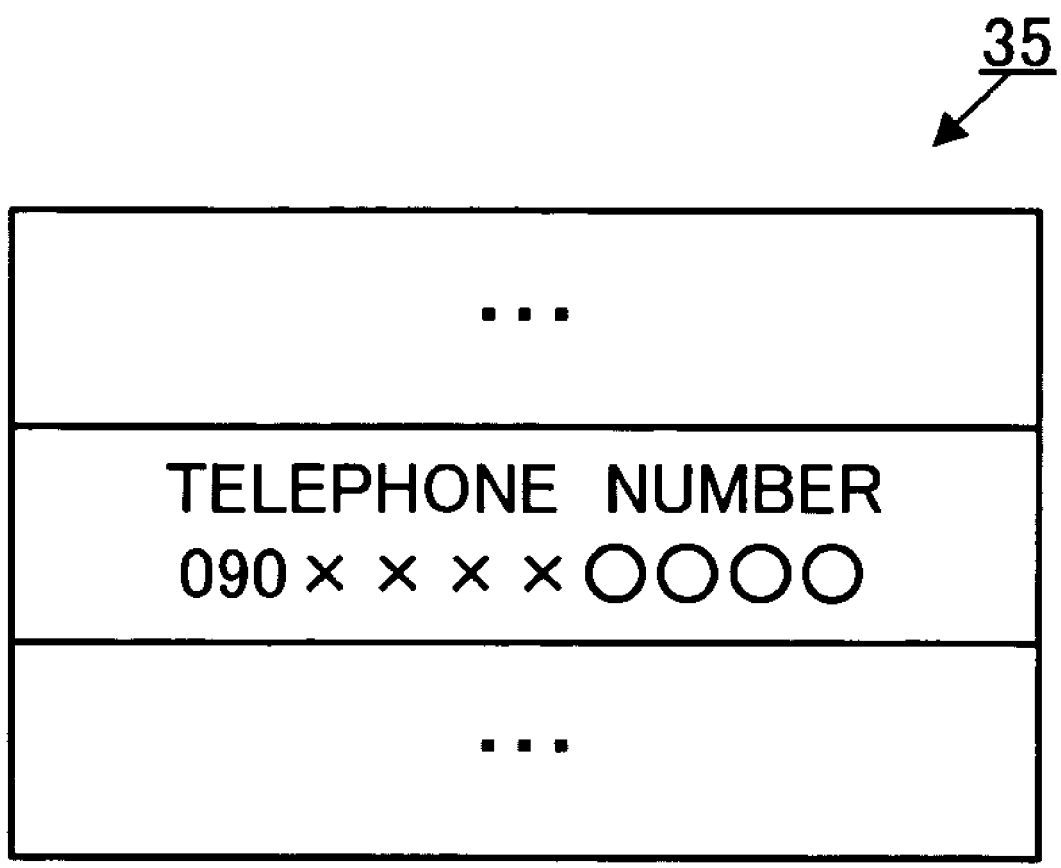
FIG. 4 is a diagram illustrating an example of the structure of data stored in a nonvolatile memory.

The nonvolatile memory 35 stores subscriber information which is unique information on the UIM card 30. FIG. 4 illustrates an example of the contents of data stored in the nonvolatile memory 35. In the embodiment, telephone numbers are stored as the subscriber information. A telephone number is for identifying the cellular phone 10 separately from another cellular phone when the cellular phone 10 performs wireless communication. In addition to the telephone numbers, the nonvolatile memory 35 can store other information, such as user names, electronic mail addresses, network identification numbers, MAC addresses, and IP addresses.

Figure 5:
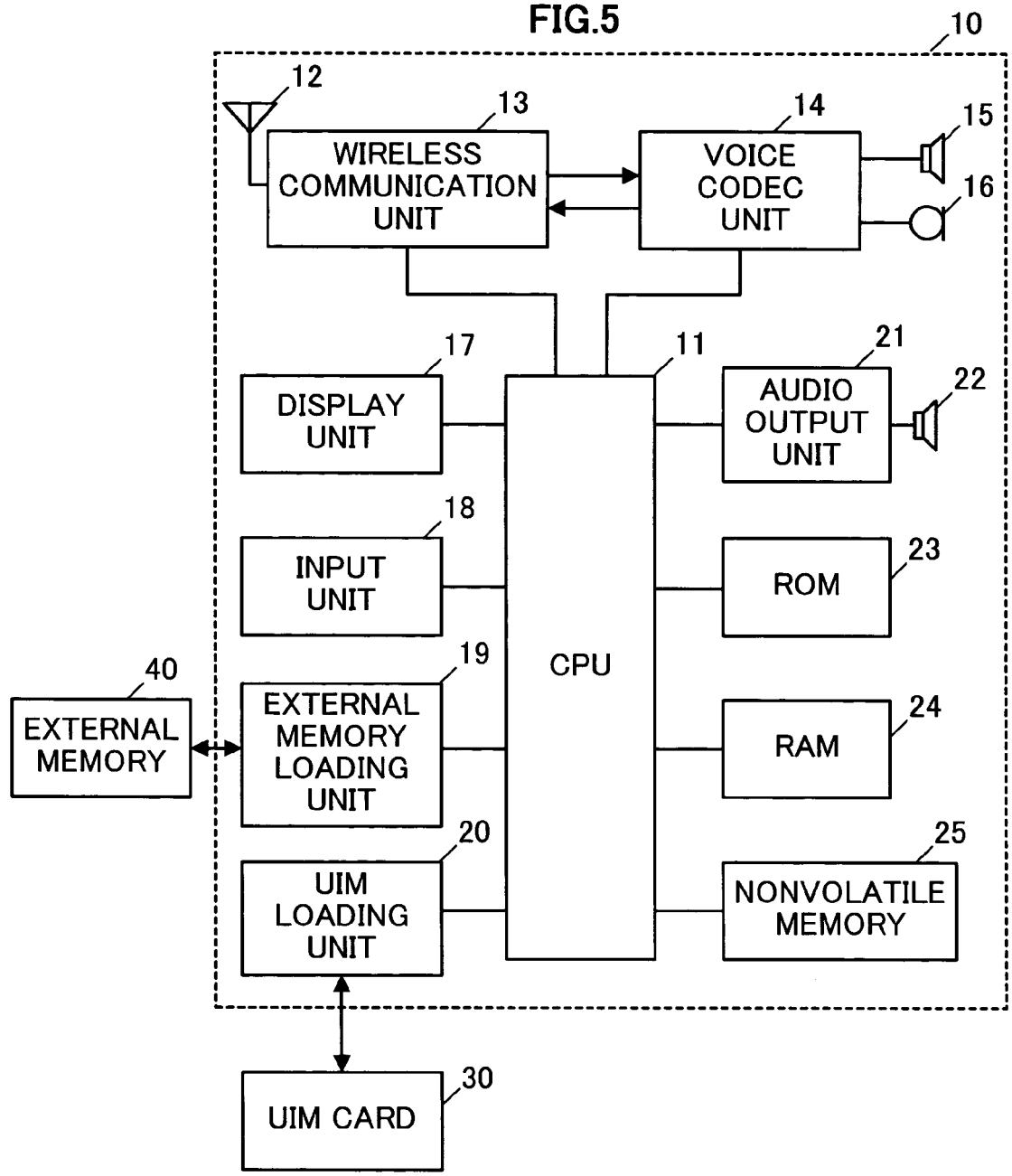
FIG. 5 is a block diagram illustrating the internal structure of a cellular phone.

Next, the internal structure of the cellular phone 10 will be explained. As illustrated in FIG. 5, the cellular phone 10 has a CPU 11, an antenna 12, a wireless communication unit 13, a voice codec unit 14, a receiver speaker 15, a transmitter microphone 16, a display unit 17, an input unit 18, an external memory loading unit 19, an UIM loading unit 20, a audio output unit 21, a speaker 22, a ROM 23, a RAM 24, and a nonvolatile memory 25.

The CPU 11 reads out various programs stored in the ROM 23 into a work area in the RAM 24, executes various processes in accordance with those programs, and stores process results into a predetermined area in the RAM 24. The CPU 11 has the display unit 17 display the process results.

The wireless communication unit 13 modulates communication data input from the CPU 11, and sends a wireless communication signal to the base station 50 through the antenna 12. The wireless communication unit 13 demodulates a wireless communication signal received from the base station 50 through the antenna 12, acquires communication control data, voice data, contents data, and the like from a demodulated baseband signal (communication data), and outputs those data to the CPU 11.

The voice codec unit 14 performs coding on a voice signal input from the transmitter microphone 16 by an A/D (Analog/Digital) converter, converts the coded signal into voice data, and outputs the voice data to the wireless communication unit 13. The voice codec unit 14 performs converting the voice data from the wireless communication unit 13 into a coded signal, decodes the coded signal into a voice signal by a D/A (Digital/Analog) converter, and outputs the voice signal to the receiver speaker 15.

The display unit 17 displays various information based on display data inputted from the CPU 11. The display unit 17 has, for example, an LCD (Liquid Crystal Display). The display unit 17 processes image data by the image operation processor (not illustrated) of the CPU 11 or display unit 17, and then records the processed data on the output buffer (not illustrated) of the display unit 17. Image information recorded on the output buffer is converted into an image signal at a predetermined synchronization timing, and output to the LCD. This makes it possible to display various images.

The input unit 18 has input keys, such as number keys, a cursor key, a set key, and various function keys, and outputs a press-down signal corresponding to a key pressed by the user to the CPU 11. The input unit 18 may have other input devices.

The external memory loading unit 19 is loaded with an external memory 40 like a flash memory card. The CPU 11 writes data in the external memory 40, and reads out data therefrom. The UIM loading unit 20 is loaded with the UIM card 30. The CPU 11 writes data in the UIM card 30, and reads out data therefrom. The user can freely remove or attach the external memory 40 and the UIM card 30.

The audio output unit 21 reproduces predetermined audio data in accordance with a singing instruction from the CPU 11 when the cellular phone 10 has an incoming call, outputs a singing signal to the speaker 22, and informs the user of a telephone call or reception of a mail. The speaker 22 and the receiver speaker 15 may be a shared single speaker.

The ROM 23 comprises a nonvolatile semiconductor memory, and stores various programs and data to be run by the CPU 11.

The RAM 24 temporarily stores various programs and data relating to those programs to be run by the CPU 11.

Figure 6:
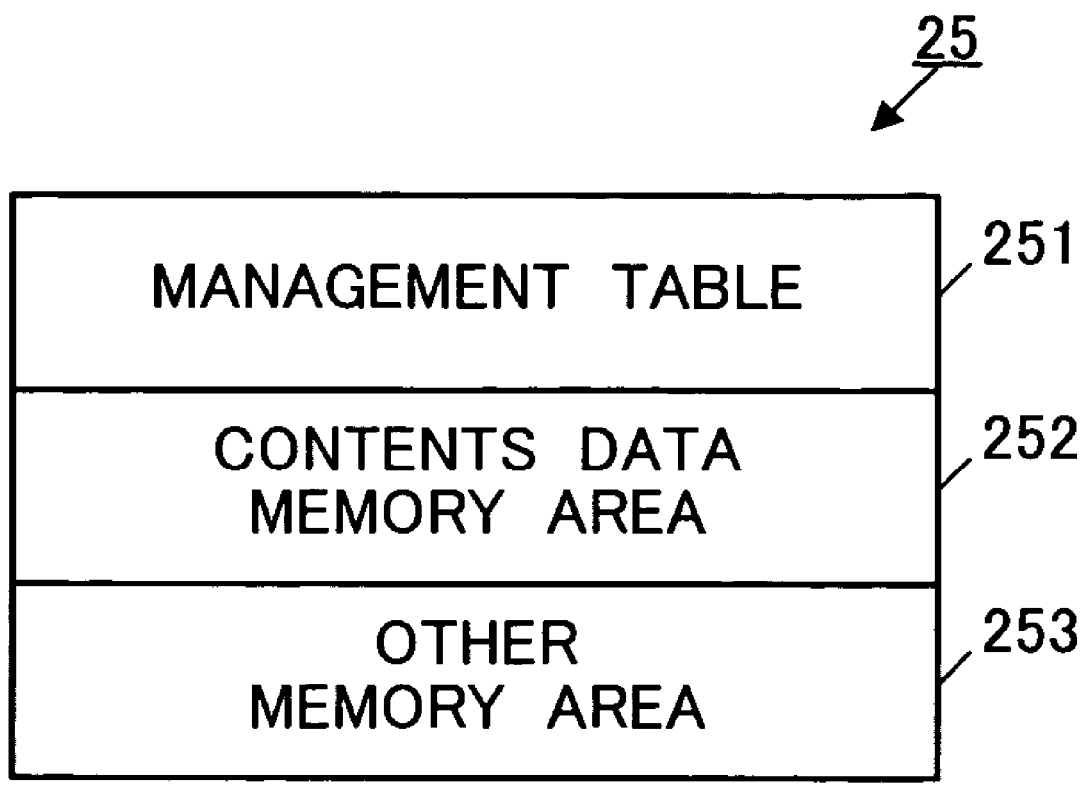
FIG. 6 is a diagram conceptually illustrating the structure of the memory area of a nonvolatile memory.

As illustrated in FIG. 6, the nonvolatile memory 25 has a management table 251, a contents data memory area 252, and other memory area 253.

Figure 7A:
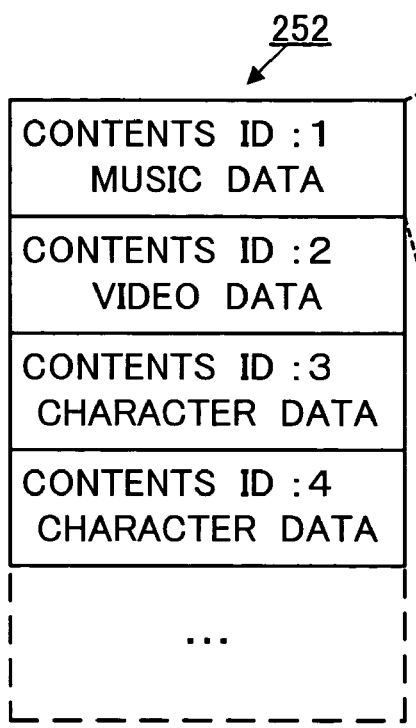
FIGS. 7A and 7B are diagrams illustrating an example of the structure of contents data stored in a contents data memory area.

As illustrated in FIG. 7A, the contents data memory area 252 stores various contents data received from the contents server 53, such as music data (e.g., ringer melodies), video data (e.g., movies), and character data (e.g., novels). The CPU 11 stores contents data received by the wireless communication unit 13 into the contents data memory area 252. The CPU 11 gives contents data a contents ID for identifying the contents data. Note that the contents ID may be one which identifies each contents data stored in the contents data memory area 252. Accordingly, the contents ID may be quoted from profile data, such as a file name, a creation data, and a data capacity.

Figure 7B:
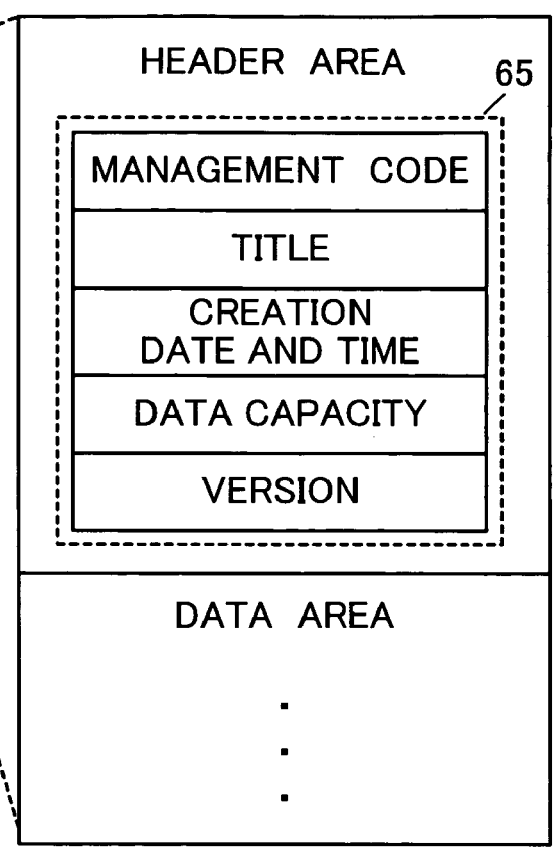

As illustrated in FIG. 7B, each contents data comprises a header area including a contents search information 65, and a data area. As illustrated in the figure, the contents search information 65 includes a management code, a title, a creation date and time, a data capacity and a version. The management code is a unique code which is given by the contents server 53 beforehand at the time of distribution of the contents data. For example, the management code is represented by numbers, characters, and symbols. The title is characters, a character string, or a text or the like. The creation date and time is a day and a time when the contents data is created. The data capacity is the data size of the contents data. The unit of the data capacity can be set arbitrary. The version is a code given at the time of creation of the contents data, and represented by numbers, characters, symbols or the like. For example, as a part of the contents data is updated, the management code is not changed, but the version is changed. That is, as the version differs, the user can come to know that the contents data is updated. The data area stores the main body of contents data.

The structure of the contents data illustrated in the figure is just an example, and an embodiment which arbitrary modifies the structure of the contents data is possible. For example, the management code may include a part of or all of the title, the creation date and time, the data capacity, and the version. This makes it possible to simplify the structure of the contents search information 65.

As illustrated in FIG. 8, the management table 251 stores a contents ID in association with the identification information of the UIM card 30 loaded when the contents data is downloaded. A telephone number is used as the identification information of the UIM card 30 in the figure. It is not necessary that the contents ID and the identification information of the UIM card 30 are associated with each other one by one. One contents ID may be associated with plural identification information of plural UIM cards 30. For example, as the user having a different UIM card 30 replaces a UIM card 30 and uses contents data having the identical contents ID, the CPU 11 sets the contents ID associated with the plurality of UIM cards 30. The CPU 11 reads out, updates, adds, and deletes information stored in the management table 251 at an arbitral timing. A subscriber number, a user name, the unique code of the UIM card 30, and a MAC address may be used as the identification information of the UIM card 30. For each contents ID, or each identification information of the UIM card 30, a date and time when data is updated, added, or deleted may be stored and associated.

The other memory area 253 is, for example, an area used as a work area at the time of various processes executed by the CPU 11. The other memory area 253 may store various set values of the cellular phone 10, data created by the user, and the like.

Next, the operation of the cellular phone 10 will be explained.

FIG. 9 is a flowchart illustrating a contents data acquisition process which is executed by the cellular phone 10. This process is realized as the CPU 11 reads out a program stored in the ROM 23 into the RAM 24 and executes the program.

First, the CPU 11 is connected to the contents server 53 based on an operational input of the user from the input unit 18, and selects contents data to be used (step S1). The contents server 53 may performs a user authentication of checking whether or not the user of the cellular phone 10 has an authority to use contents. That is, the input unit 18 receives input of information required for the user authentication, such as a user name and a password. The CPU 11 controls the wireless communication unit 13, and sends these information to the contents server 53. The controller 61 of the contents server 53 permits usage of the contents if information, such as a user name and a password stored in the memory unit 63 are consistent with the received information on the user name and the password, and does not permit if they are not consistent with the received username and password.

The invention does not limit the scheme of the user authentication. Authentication may be performed based on a fact whether or not the cellular phone 10 has a function of using (reproducing) contents data. For example, it is possible that the controller 61 of the contents server 53 does not permit usage of the contents when the cellular phone 10 which does not have a function of reproducing music data, or in which a predetermined reproduction program for reproducing the music data is not installed tries to use contents which distributes the music data. That is, the controller 61 of the contents server 53 requests the cellular phone 10 to send information on the cellular phone 10, such as the number of reproduction, the music scale of the audio output unit 21, the image resolution of the LCD, and the kind and version of the reproduction program. The CPU 11 of the cellular phone 10 controls the wireless communication unit 13, and sends the requested information to the contents server 53. The controller 61 of the contents server 53 authenticates regarding whether or not the cellular phone 10 has a function of using the contents based on the received information and a predetermined condition for using the contents. Or, the contents server 53 may performs authentication based on the model number or the like of the cellular phone 10. Accordingly, because the contents data memory area 252 does not store substantially unavailable contents data, the CPU 11 does not waste a memory area, and can use the nonvolatile memory 25 efficiently.

Next, the CPU 11 requests the contents server 53 to send contents search information 65 corresponding to the selected contents data (step S2).

The controller 61 of the contents server 53 sends the requested contents search information 65 to the cellular phone 10. The CPU 11 acquires the contents search information 65 of the selected contents data from the contents server 53 (step S3). The CPU 11 temporarily stores the acquired contents search information 65 into the other memory area 253.

The CPU 11 determines whether or not contents data which is identical to the selected contents data is already saved in the contents data memory area 252 based on the contents search information acquired from the contents server 53 (step S4). In more detail, the CPU 11 determines whether or not a management code, a title, a creation date and time, a data capacity, and a version included in the contents search information 65 acquired from the contents server 53 are consistent with information stored in the contents data memory area 252. In the embodiment, if both contents search information 65 are consistent with each other, the CPU 11 determines that both are the identical contents data. However, an embodiment which arbitrarily changes a determination criterion may be employed.

If the contents data which is identical to the selected contents data is already saved in the contents data memory area 252 (step S4: YES), the CPU 11 reads out the identification information on the UIM card 30 currently loaded in the UIM loading unit 20. The CPU 11 determines whether or not an identification information associated with the contents ID of the contents data in the management table 251 of the nonvolatile memory 25 is consistent with the read-out identification information of the UIM card 30 (step S5). If a plurality of identification information is associated with one contents ID, the CPU 11 performs determination with all associated identification information. In contrast, if the contents data which is identical to the selected contents data is not saved in the contents data memory area 252 (step S4: NO), the CPU 11 shifts the flow to the process in step S9 to be discussed later.

Figure 10A:
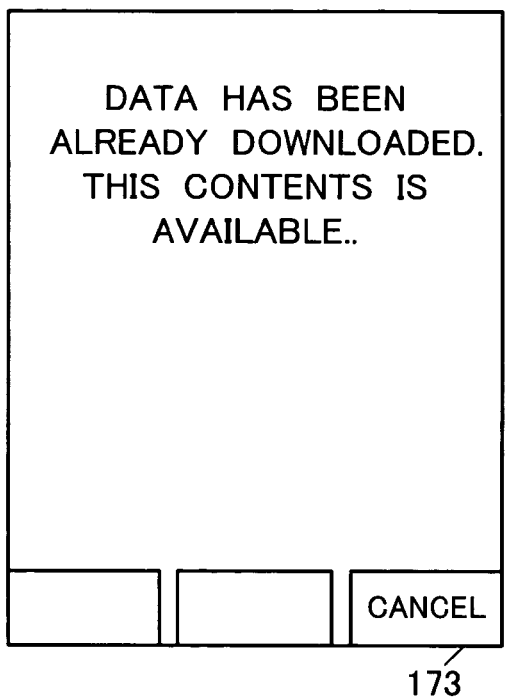
FIGS. 10A to 10D are diagrams illustrating examples of display screens displayed on a liquid crystal display unit.

If the identification information associated with the contents ID of the contents data is consistent with the identification information of the UIM card 30 (step S5: YES), the CPU 11 notifies the user that the contents data is already downloaded and available (step S6). For example, the CPU 11 controls the display unit 17, and displays a screen illustrated in FIG. 10A on the LCD for a predetermined time. After that, the CPU 11 starts reproduction of the contents data already stored in the contents data memory area 252. As a result, if the identical contents data is already downloaded, the cellular phone 10 does not download the identical contents data again. Accordingly, it is possible to suppress the communication traffic of the cellular phone system 100. The communication cost of the cellular phone 10 is also suppressed. The CPU 11 may start reproducing the contents data without notifying the user. In this case, the CPU 11 skips the step S6. This makes it possible for the user to use the contents quickly.

In the step S5, if the identification information associated with the contents ID of the contents data is not consistent with the identification information of the UIM card 30 (step S5: NO), the CPU 11 determines whether or not the contents data is subject to download (step S7). For example, the CPU 11 controls the display unit 17, and displays a screen illustrated in FIG. 10B on the LCD. As illustrated in the figure, the CPU 11 displays a message to the effect that, for example, "Data is already saved. Change association without downloading data to have contents available?". This screen includes (1) an input button 171 for an instruction of only changing the management table 251 without downloading the contents data, (2) an input button 172 for an instruction of newly acquiring contents data separately from the contents data already saved in the contents data memory area 252, and (3) an input button 173 for an instruction of canceling an operation of using the contents. The CPU 11 determines whether or not the contents data is to be downloaded based on which input button is pressed down. If the input button 173 is pressed down, the CPU 11 discards temporary stored data, and terminates the contents data acquisition process.

Figure 10B:
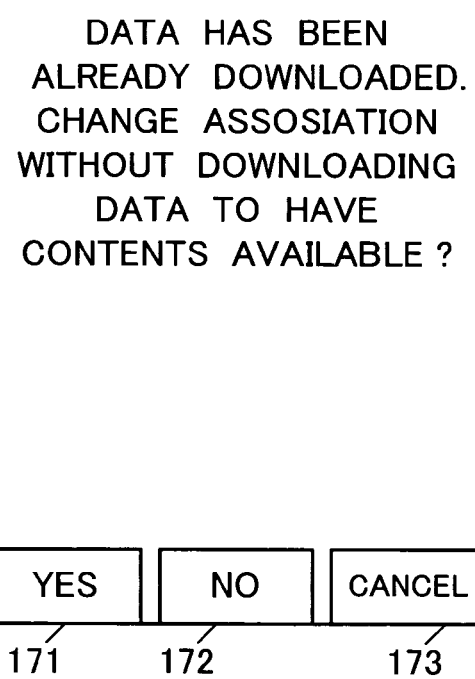
Figure 10C:
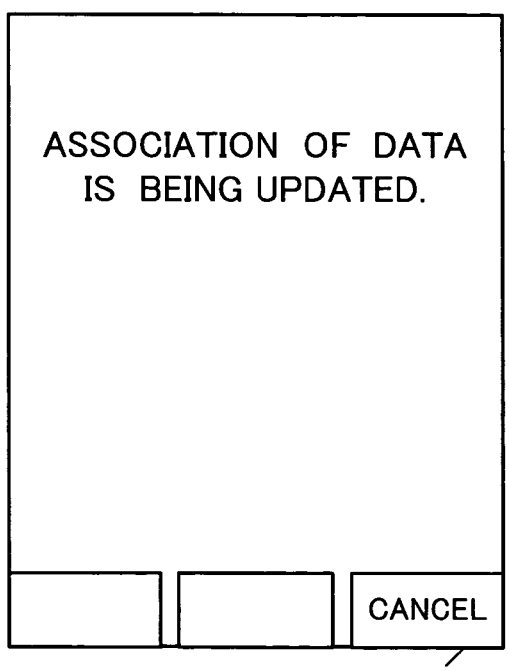

When it is determined that the contents data is not to be downloaded, i.e., when the input button 171 in the selection screen illustrated in FIG. 10B is pressed down (step S8: NO), the CPU 11 requests the contents server 53 to executes a payment process without executing the download process of the contents data (step S10). The payment process will be discussed in detail later. The CPU 11 updates the management table 251 (step S11). Specifically, the CPU 11 additionally associates the corresponding contents ID in the management table 251 with the identification information of the UIM card 30 currently loaded in the UIM loading unit 20, and stores them. FIG. 10C illustrates a display example of a screen displayed on the LCD of the display unit 17 when the management table 251 is updated. As the updating of the management table 251 ends, the CPU 11 terminates displaying of the screen, and starts reproduction of the contents data. Accordingly, the user can use the contents data.

As explained, if the identical contents data is already downloaded by another user, the cellular phone 10 does not download the identical contents data again, but uses the contents data already downloaded, and reproduces this contents data. Accordingly, the cellular phone 10 can suppress the amount of data stored in the contents data memory area 252. It is possible to suppress the communication traffic of the cellular phone 10. The user can quickly start using of the contents data. The communication cost of the cellular phone 10 can be suppressed.

In the step S8, when it is determined that the contents data is to be downloaded, i.e., when the input button 172 in the selection screen illustrated in FIG. 10B is pressed down (step S8: YES), the CPU 11 executes the download process of the contents data (step S9). The download process will be discussed in detail later.

Figure 10D:
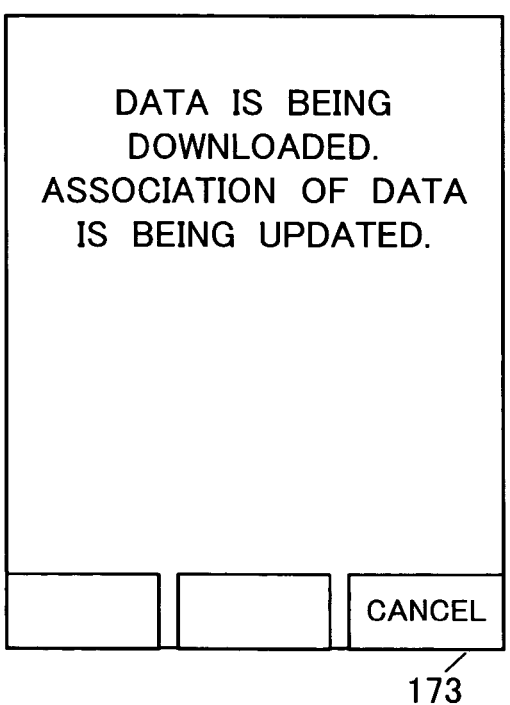

The CPU 11 requests the contents server 53 to execute the payment process (step S10). The CPU 11 updates the management table 251 (step S11). Specifically, the CPU 11 gives a new contents ID to the downloaded contents data. The CPU 11 stores the contents ID in association with the identification information of the UIM card 30 currently loaded in the UIM loading unit 20 in the management table 251. FIG. 10D illustrates a display example of a screen displayed on the LCD of the display unit 17 when the contents data is downloaded and the management table 251 is updated. As the download of the contents data and the update of the management table 251 end, the CPU 11 terminates displaying of the screen, and starts reproduction of the contents data. Accordingly, the user can use the contents data.

The CPU 11 may always determine that the contents data is not to be downloaded in the step S8. That is, if the selected contents data is already stored in the contents data memory area 252, the CPU 11 may not download the contents data always. Accordingly, an effectiveness that the user is not conscious of another user's usage of the identical contents, or the contents data used by the user does not become known by anyone else can be obtained.

In the embodiment, the payment process is executed in the step S10, but may be executed (or not executed) based on whether the contents data to be used is charged or free. In this case, for example, the contents search information 65 is structured in such a manner as to store a flag indicating that the contents is charged or free. If the flag value indicating that the contents data to be used is free is set to the contents search information 65 of the contents data to be used, the CPU 11 does not execute the payment process, and if not, the CPU 11 may execute the payment process.

(Download Process)

Next, the download process of contents data will be explained with reference to FIG. 11.

First, the CPU 11 acquires (downloads) contents data corresponding to the contents search information 65 from the contents server 53 (step S21). The CPU 11 temporarily stores the acquired contents data in the other memory area 253.

The CPU 11 gives a new contents ID to the downloaded contents data (step S22).

The CPU 11 saves the contents data temporarily stored in the other memory areas 253 and the contents search information 65 in the contents data memory area 252 (step S23).

Accordingly, even if the UIM card 30 is replaced, when acquisition of the identical contents data is required, the CPU 11 can be controlled in such a manner as not to acquire the identical contents data again by executing the foregoing contents data acquisition process.

The CPU 11 may determine the remaining capacity of the contents data memory unit 252, and change an operation depending on a determination result. That is, before the step S21, the CPU 11 determines whether or not there is a sufficient memory area for storing contents data to be downloaded from now based on the remaining capacity of the contents data memory area 252 and information included in the contents search information 65 and indicating the data capacity of the contents data. When there is a sufficient memory area, the CPU 11 executes the process in accordance with the foregoing flowchart. If there is not a sufficient memory area, the CPU 11 ensures an area which can save the contents data.

There are various methods to ensure the memory area. As an example, the CPU 11 is structured in such a manner as to set the contents ID, the identification information of the UIM card 30, and a record date and time associated with one another, and stores them in the management table 251. If there is not a sufficient memory area, the CPU 11 refers to the management table 251, and deletes contents data stored on the oldest date and time from the contents data memory area 252. The CPU 11 deletes data corresponding to the deleted contents ID from the management table 251. If this results in ensuring of a sufficient memory area, the CPU 11 stores the downloaded contents data in the contents data memory area 252. If a sufficient memory area is not ensured yet, the process is repeated until the sufficient memory area is ensured.

(Payment Process)

Figure 12:
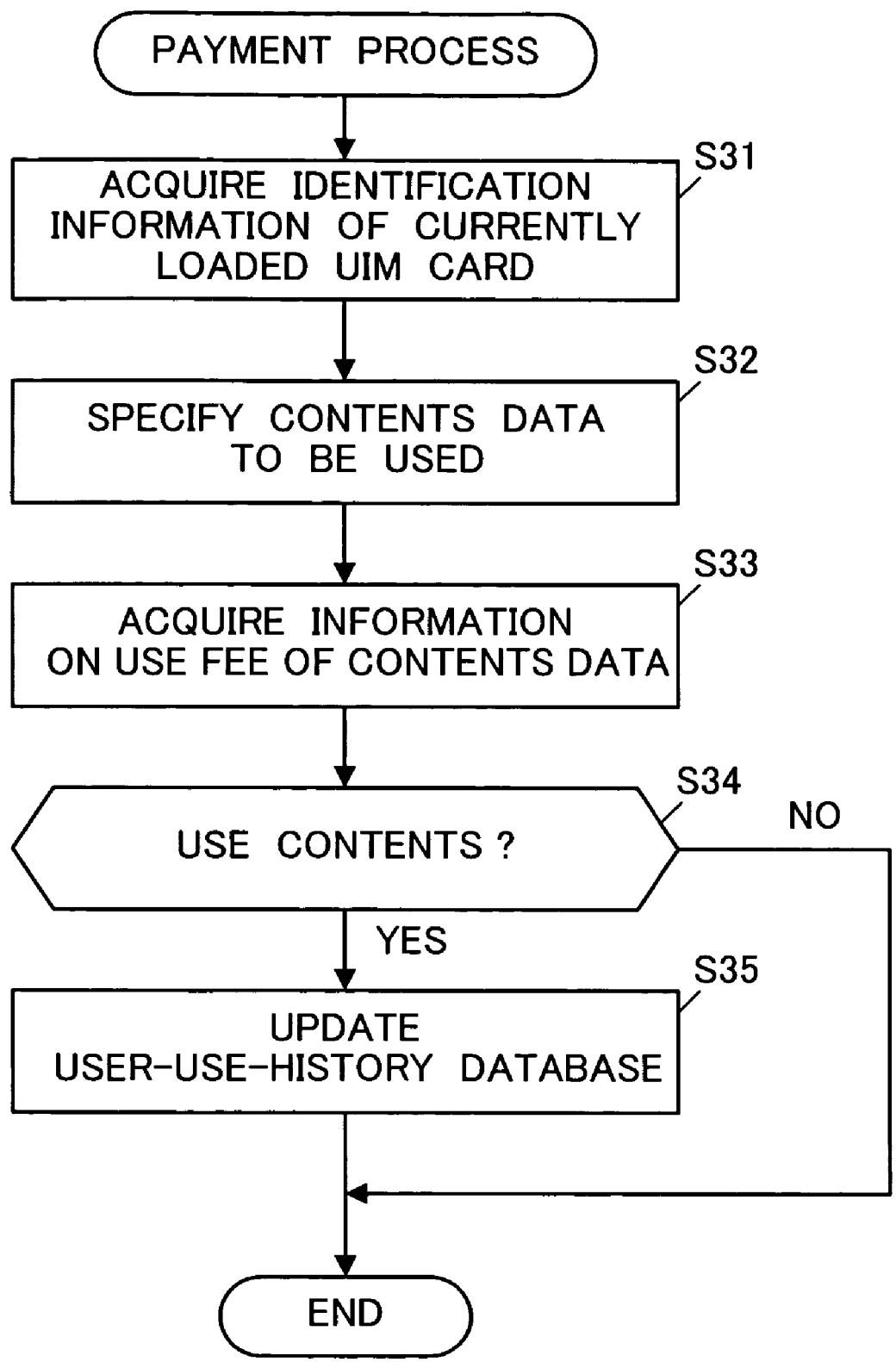
FIG. 12 is a flowchart illustrating a payment process.

Next, the payment process will be explained with reference to FIG. 12.

The payment process is executed by the contents server 53 as the user of the cellular phone 10 sends information indicating that the user pays a fee for using contents data to the contents server 53. The memory unit 63 of the contents server 53 stores a fee beforehand for each contents data. As the payment process is executed, the memory unit 63 stores information on the usage fee of each user. The user will be charged with the usage fee of contents data together with the communication fee of the cellular phone 10 at a later date. This will now be explained in detail.

First, the controller 61 acquires the identification information (telephone number or the like) of the UIM card 30 loaded in the UIM loading unit 20 of the cellular phone 10 which uses contents data from the cellular phone 10 (step S31). That is, as the communication unit 62 receives a notification to the effect that the payment process is to be started from the cellular phone 10, the controller 61 starts the payment process, and requests the cellular phone 10 to send the identification information of the UIM card 30 loaded in the UIM loading unit 20 of the cellular phone 10. As the cellular phone 10 receives the request, the identification information of the UIM card 30 loaded in the UIM loading unit 20 is sent. The controller 61 receives this identification information.

The controller 61 specifies contents data to be used by the cellular phone 10 (step S32). That is, the controller 61 specifies the contents data to be used by the cellular phone 10 based on the contents search information 65 requested by the cellular phone 10 at the step S2 in the aforementioned contents data acquisition process. For example, the controller 61 acquires the management code of the contents data to be used, and temporarily stores this data in the RAM.

The controller 61 acquires information on the usage fee of the contents data specified in the step S32 from the fee table database 66 stored in the memory unit 63 (step S33). For example, FIG. 13A illustrates an example of the structure of information stored in the fee table database 66. The fee table database 66 stores the management code of the contents data in association with a fee structure for using the contents data. The controller 61 temporarily stores information on the fee read out from the fee table database 66. The data format of data stored in the fee table database 66 is not limited to the aforementioned case.

The controller 61 determines whether or not the contents data specified in the step S32 is to be used by the cellular phone 10 (step S34). When the contents data is not to be used by the cellular phone 10 (step S34: NO), the controller 61 terminates the payment process. In contrast, when the contents data is to be used by the cellular phone 10 (step S34: YES), the controller 61 updates the user-use-history database 67 (step S35). That is, the controller 61 sets the identification information of the UIM card 30 of the cellular phone 10, the management code of the contents data specified in the step S32, and a use date and time associated with one another, and stores them in the user-use-history database 67. FIG. 13B illustrates an example of the structure of data stored in the user-use-history database 67. For example, every time a cellular phone 10 uses contents data, the controller 61 records one record in the user-use-history database 67. The format of data stored in the user-use-history database 67 is not limited to this case.

The controller 61 of the contents server 53 executes the payment process in this manner. A contents provider charges the user with the usage charge of the contents on, for example, the billing date of every month based on information stored in the user-use-history database 67.

(Flow of Process of Entire Cellular Phone System)

To facilitate understanding of the invention, a circumstance where the cellular phone 10 and the contents server 53 work together to execute the foregoing processes will be explained with reference to FIG. 14.

First, the CPU 11 of the cellular phone 10 selects contents data to be used, controls the wireless communication unit 13, and requests the contents server 53 to send the contents search information 65 corresponding to the contents data (step S41). The controller 61 of the contents server 53 acquires the request contents search information 65 from the memory unit 63, controls the communication unit 62 in such a manner as to send the acquired information (step S42). The CPU 11 of the cellular phone 10 receives the contents search information 65 from the contents server 53, and determines whether or not the contents data is already stored in the contents data memory area 252 based on the contents search information 65 and the management table 251 (step S43).

If the contents data is not stored in the contents data memory area 252, or if the contents data is already stored in the contents data memory area 252 and is to be downloaded again, the CPU 11 controls the wireless communication unit 13, and requests the contents server 53 to send the contents data (step S44). The controller 61 of the contents server 53 acquires the requested contents data from the memory unit 63, and controls the communication unit 62 in such a manner as to send the contents data to the cellular phone 10 (step S45). The CPU 11 of the cellular phone 10 receives the contents data from the contents server 53, and stores the received data in the contents data memory area 252 (step S46). If the contents data is already stored in the contents data memory area 252, the CPU 11 and the controller 61 skip the processes of steps S44 to S46.

The CPU 11 of the cellular phone 10 controls the wireless communication unit 13 to send a notification to the effect that the contents data is to be used to the contents server 53 (step S47). Or, a notification to the effect that the payment process is to be executed may be sent. As the controller 61 of the contents server 53 receives this notification, the payment process is executed by the controller 61 (step S48). As the payment process ends, the controller 61 controls the communication unit 62 to send a notification to the effect that the payment process ends to the cellular phone 10 (step S49). As the CPU 11 receives a notification to the effect that the payment process ends, the management table 251 is updated (step S50). That is, the CPU 11 stores the contents ID of the contents data already stored in the contents data memory area 252 further in association with the identification information of the UIM card 30. The CPU 11 starts using the contents data (step S51).

As explained above, if contents data which is identical to the selected contents data is already stored in the contents data memory area 252, the cellular phone 10 does not download the contents data, uses and reproduces the already stored contents data. By changing the management table 251, it is possible to prevent that data is saved redundantly. This results in effective usage of the memory area. Therefore, an efficiency in the use of the memory can be improved, and data can be shared with a further small data capacity. By not downloading redundant contents data, causing of an unnecessary communication charge can be prevented.

If another user has already downloaded the identical contents data, it is possible to employ a structure that using the contents data without downloading it or newly downloading the contents data and using it separately from the contents data already saved in the contents data memory area 252 is selected.

As a modified example of the embodiment, the contents search information 65 may include a predetermined keyword and information, and a structure that contents data is downloaded again even if the identical contents data is already in the contents data memory area 252 when a predetermined condition is satisfied may be employed.

That is, the nonvolatile memory 25 stores a condition table 254 which stores predetermined conditions as exemplified in FIG. 15. An item name indicates the kind of information included in the contents search information 65. The kind is, for example, the management code, title, creation date and time, data capacity, or version of the contents data. Or, the kind may be the URL (Uniform Resource Locator) in which the contents data is stored. The condition may be set arbitrary. If the condition is satisfied, the CPU 11 downloads the contents data again even if the identical contents data is already in the contents data memory area 252. The condition is represented by a logical expression, a formula, a character string, or the like. Information stored in the condition table 254 is set by the user beforehand with the input key or the like of the input unit 18, and is changed arbitrary. The information may be stored in the ROM 23 beforehand.

The CPU 11 executes a determination process regarding whether or not the condition stored in the condition table 254 is satisfied based on the contents search information 65 acquired from the contents server 53 in the aforementioned contents data acquisition process. The determination process is executed by the CPU 11 after the step S4 and before the step S5. If the condition stored in the condition table 254 is not satisfied, the CPU 11 executes the processes after the step S5 in accordance with the foregoing flowchart. In contrast, if the condition stored in the condition table 254 is satisfied, the CPU 11 shifts the flow to the download process in the step S9.

For example, it is supposed that the condition table 254 stores data illustrated in FIG. 15. When the management code of the contents search information 65 starts a number "9", when a title includes "traffic information", when a creation date and time is greater than or equal to one month before, or a URL starts "https://", the CPU 11 starts over downloading of contents data even if the contents data is already stored in the contents data memory area 252 (step S9). The CPU 11 requests execution of the payment process (step S10), gives a new contents ID to the downloaded contents data, and updates the management table 251 (step S11). As a result, the cellular phone 10 always downloads the contents data without reusing information to which a confidentiality is demanded, information which is known as to be updated frequently, information which requires provision of latest data and the like.

The description for the foregoing embodiment is an example of an electronic device of the invention, and does not limit the invention. The invention is applicable to other communication terminals, such as a personal computer, a PDA (Personal Digital Assistance), and a PHS (Personal Handyphone System). The detail of the structure of each unit which constitutes the cellular phone 10 and the detail of the operation of each unit can be appropriately modified without departing from the scope of the invention.

For example, the contents data may be music data, video data, character data, and image data, and is not limited to those data.

The contents data is not limited to one which is acquired over a wireless communication or a wired communication like the Internet, and may be acquired from an external memory medium like an optical disk.

Memory means which stores contents data is not limited to the nonvolatile memory 25, and may be the external memory 40 which is loaded in the external memory 40 and used.

The determination whether or not contents data is already saved in the contents data memory area 252 is performed based on contents search information, or whether or not downloaded contents data is consistent with. If it is determined that downloaded contents data is consistent with contents data saved in the contents data memory area 252, a memory area can be ensured by deleting either data.

The contents search information 65 may include predetermined conditions for using the contents (e.g., information on a service which requires a use contract, the number of scale required for reproduction, the resolution of the LCD, and the kind and version of a reproduction program). That is, after contents search information 65 is acquired in the step S3, and before the determination in the step S4, the CPU 11 determines whether or not the function of the cellular phone 10 satisfies the condition, and if the condition is satisfied, the processes following the step S4 are executed. If the condition is not satisfied, the contents data acquisition process is terminated. In this case, it is preferable that a message to the effect that the cellular phone 10 does not meet the condition for using contents data should be output to the LCD of the display unit 17, and generated as a speech from the speaker 22 connected to the audio output unit 21. Accordingly, the contents data memory unit 252 does not store unavailable contents data, and it is possible to use the memory efficiently. Because the cellular phone 10 determines whether the contents is available or not, it is possible to suppress the communication traffic.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-253410 filed on Sep. 1, 2005, and including specification, claims, drawings and summary. The disclosure of the above Japanese Patent Application is incorporated herein by reference in its entirety.

What is claimed is:

1. An electronic device that receives data from an external device over a communication network, comprising:
   a memory unit which stores said data received from said external device, and stores a data number of said data in association with unique information stored in an external memory medium removable from the electronic device;
   a read-out unit which reads out said unique information from said removable external memory medium with said external memory medium loaded;
   a receiving unit which receives an instruction of selecting data to be acquired from said external device;
   a data presence/absence determination unit which determines whether or not data identical to said data indicated by said selection instruction is already stored in said memory unit; and
   an operation control unit which performs a control in such a manner as to change an association of said data number of said data and said unique information stored in said memory unit when said data presence/absence determination unit determines that said data identical to said data indicated by said selection instruction is already stored in said memory unit, and requests said external device to send said data indicated by said selection instruction when said data presence/absence determination unit determines that said data identical to said data indicated by said selection instruction is not stored in said memory unit,
   wherein said unique information comprises at least one of a subscriber number, a telephone number, a user name, an electronic mail address, a network identification number, a media access control (MAC) address and an IP address.

2. The electronic device according to claim 1, further comprising a consistency determination unit which determines whether or not said unique information read out by said read-out unit is consistent with said unique information associated with said data number of said identical data already stored in said memory unit when said data presence/absence determination unit determines that said data identical to said data indicated by said selection instruction is already stored in said memory unit, and wherein
   when said consistency determination unit determines that said unique information read out by said read-out unit is not consistent with said unique information associated with said identical data already stored in said memory unit, said operation control unit associates said identical data already stored in said memory unit with said unique information read out by said read-out unit.

3. The electronic device according to claim 1, further comprising
   a memory control unit which acquires said data indicated by said selection instruction from said external device, and stores a data number of said acquired data and said unique information read out by said read-out unit in association with each other in said memory unit, regardless of a determination result of said data presence/absence determination unit, and
   a selection unit which selects whether a process of said operation control unit is prioritized or a process of said memory control unit is prioritized.

4. The electronic device according to claim 1, wherein
   said operation control unit is connected to said external device over a wireless communication network, and requests said external device to send data, and
   said unique information is information for identifying the electronic device and another electronic device.

5. The electronic device according to claim 1, further comprising a search information acquisition unit which acquires search information corresponding to data indicated by a selection instruction from said external device when said receiving unit receives said selection instruction of said data, and wherein
   said memory unit further stores said search information for searching contents of data for each stored data, and
   said data presence/absence determination unit determines that said data stored in said memory unit is identical to said data indicated by said selection instruction when said search information stored in said memory unit is consistent with search information acquired by said search information acquisition unit.

6. The electronic device according to claim 5, wherein said search information includes at least one or more of a management code, a title, a creation date and time, a data size, and version information, of said data.

7. The electronic device according to claim 5, further comprising an elimination unit, and wherein
   said search information includes information indicating a data size of said data,
   said memory unit further stores information indicating a date and time when said association of said data number of said data and said unique information is stored, and
   when a data size of data corresponding to search information acquired by said search information acquisition unit is larger than a remaining storable data capacity of said memory unit, said elimination unit eliminates data indicated by said data number in an ascending from an older date and time.

8. The electronic device according to claim 5, wherein
   said search information includes information indicating a predetermined condition for using said data, and
   when the electronic device does not meet said condition, said operation control unit does not request said external device to send data indicated by said selection instruction.

9. The electronic device according to claim 5, wherein
   said memory unit stores a predetermined condition under which said search information is used, and
   said operation control unit determines whether said predetermined condition is satisfied or not based on search information acquired by said search information acquisition unit, and requests said external device to send data indicated by said selection instruction regardless of a determination result of said data presence/absence determination unit when said predetermined condition is satisfied.

10. A computer-readable recording medium storing a program that allows a computer which receives data from an external device over a communication network to function as:
- a memory unit which stores said data received from said external device, and stores a data number of said data in association with unique information stored in an external memory medium removable from the computer;
- a read-out unit which reads out said unique information from said external memory medium with said removable external memory medium loaded;
- a receiving unit which receives an instruction of selecting data to be acquired form said external device;
- a data presence/absence determination unit which determines whether or not data identical to said data indicated by said selection instruction is already stored in said memory unit; and
- an operation control unit which performs a control in such a manner as to change an association of said data number of said data and said unique information stored in said memory unit when said data presence/absence determination unit determines that said data identical to said data indicated by said selection instruction is already stored in said memory unit, and requests said external device to send said data indicated by said selection instruction when said data presence/absence determination unit determines that said data identical to said data indicated by said selection instruction is not stored in said memory unit,
- wherein said unique information comprises at least one of a subscriber number, a telephone number, a user name, an electronic mail address, a network identification number, a media access control (MAC) address and an IP address.

11. A method of receiving data, by an electronic device, from an external device over a communication network, the method comprising:
- a memory step of storing said data received from said external device, and storing a data number of said data in association with unique information stored in an external memory medium removable from the electronic device;
- a reading out step of reading out said unique information from said removable external memory medium with said external memory medium loaded;
- a receiving step of receiving an instruction of selecting data to be acquired from said external device;
- a data presence/absence determination step of determining whether or not data identical to said data indicated by said selection instruction is already stored in said memory step; and
- an operation control step of performing a control in such a manner as to change an association of said data number of said data and said unique information stored in said memory step when in said data presence/absence determination step whether or not said data identical to said data indicated by said selection instruction is already stored in said memory step is determined, and requesting said external device to send said data indicated by said selection instruction when in said data presence/absence determination step whether said data identical to said data indicated by said selection instruction is not stored in said memory step is determined,
- wherein said unique information comprises at least one of a subscriber number, a telephone number, a user name, an electronic mail address, a network identification number, a media access control (MAC) address and an IP address.

* * * * *